United States Patent Office.

CHARLES F. PARROTT, OF NEW YORK, N. Y., ASSIGNOR TO HIMSELF AND JOHN F. KOHLER, OF SAME PLACE.

Letters Patent No. 105,720, dated July 26, 1870.

IMPROVEMENT IN TREATING AND PRESERVING GRAIN IN BULK.

The Schedule referred to in these Letters Patent and making part of the same

*To all whom it may concern:*

Be it known that I, CHARLES F. PARROTT, of the city, county, and State of New York, have invented a new Chemical Process of Treating Grain for the purpose of Preserving it and of Restoring its Quality when Damaged; and I do hereby declare that the following is a full, clear, and exact description thereof.

There are three principal causes of loss or deterioration in stored grain, viz.:

First, the devastation caused by vermin, such as insects of various kinds and rats and mice.

Second, the taint produced by mustiness, smut, black-rust, fire-blast, blight, &c.

Third, the fermentation to which grain is liable under the influence of heat and dampness.

The object of this invention is to destroy or arrest the incipient action of these causes of loss and deterioration; and to this end, It consists in blowing through the grain, while on the granary floor, or contained in a bin, or any suitable receptacle, a mixture of sulphurous acid and carbonic acid gases. The carbonic acid is destructive to whatever animal life there is or may be in the grain, and the sulphurous acid acts as a deodorizer and an antiseptic and impedes fermentation.

The process may be conducted in various ways and with various constructions and arrangements of apparatus, but I will describe a simple form of apparatus which will serve to illustrate the process, and which will work well in practice.

Contiguous to the granary, bin, or receptacle containing the grain to be treated, I arrange a furnace for the combustion of charcoal, to produce carbonic acid, and a separate furnace or oven for burning sulphur to produce sulphurous acid. These two furnaces, or this furnace and oven, have no direct communication with each other, but have outlet-pipes communicating with one common aperture in the floor of the granary, or in the bottom or lower part of the bin or receptacle containing the grain.

The outlet-pipe from the furnace or oven containing the sulphurous acid should be of lead.

The aperture above mentioned may be covered with a wire-gauze distributer, or be in communication with perforated or reticulated distributers arranged within or under the grain to be treated.

The discharge-pipe from a suitably-arranged fan or blowing apparatus is also in communication with the same aperture as the pipes from the charcoal furnace and the sulphur furnace or oven.

The apparatus is set in operation by igniting the charcoal and the sulphur, and setting the fan or blowing apparatus in motion. The blower drives the sulphurous acid and carbonic acid along with the air which it itself discharges into and among the grain through which the gases are thus caused to circulate for the purpose of destroying or arresting the incipient action of various causes of deterioration.

What I claim as my invention, and desire to secure by Letters Patent, is—

The treatment of grain with a mixture of carbonic acid and sulphurous acid gases, substantially as and for the purpose herein specified.

C. F. PARROTT.

Witnesses:
FRED. HAYNES,
HENRY T. BROWN.